F. S. ELLETT.
BACK PEDALING COASTER BRAKE.
APPLICATION FILED JULY 8, 1908.

924,973.

Patented June 15, 1909.

WITNESSES:
Clarence W. Carroll
L. Thow.

INVENTOR:
Frederick S. Ellett
by Osgood Davis
his attorneys

UNITED STATES PATENT OFFICE.

FREDERICK S. ELLETT, OF ELMIRA, NEW YORK, ASSIGNOR TO ECLIPSE MACHINE COMPANY, OF ELMIRA, NEW YORK, A CORPORATION OF NEW YORK.

BACK-PEDALING COASTER-BRAKE.

No. 924,973.  Specification of Letters Patent.  Patented June 15, 1909.

Application filed July 8, 1908. Serial No. 442,614.

*To all whom it may concern:*

Be it known that I, FREDERICK S. ELLETT, a citizen of the United States, and resident of Elmira, in the county of Chemung and State of New York, have invented certain new and useful Improvements in Back-Pedaling Coaster-Brakes, of which the following is a specification.

This invention relates to back pedaling coaster brakes for velocipedes and other vehicles, and has for its object a simple, strong construction of few parts.

Figure 1:
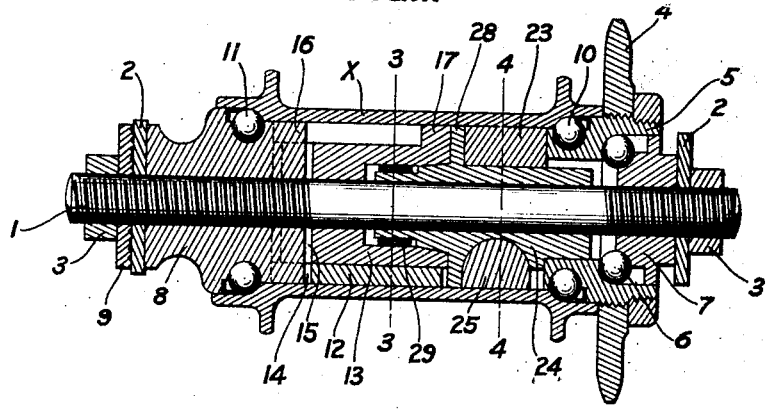
Figure 2:
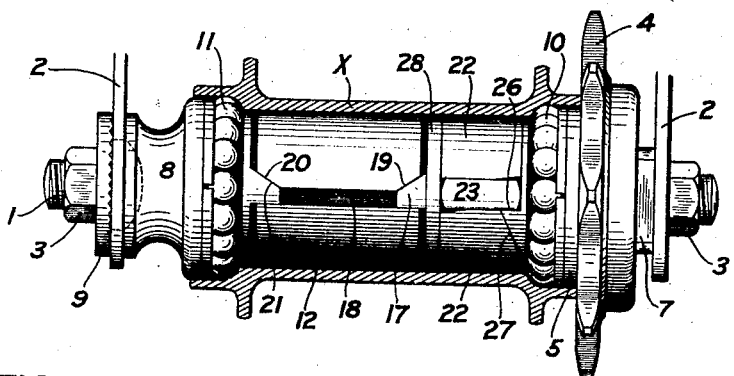
Figure 3:
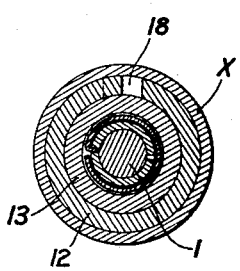
Figure 4:
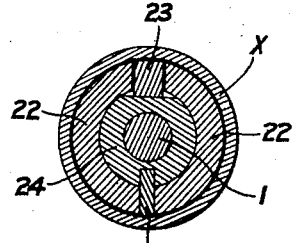
Figure 5:
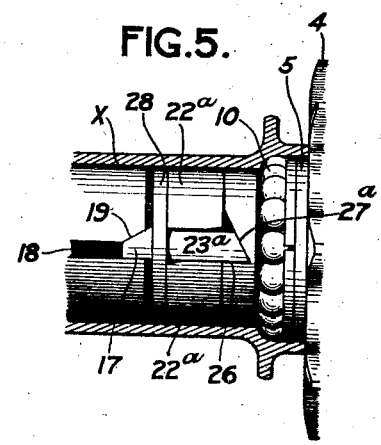

In the drawings:—Figure 1 is a central, longitudinal section of the rear or driving wheel of a bicycle, equipped with the coaster brake; Fig. 2 is a side elevation of the same, in section to show the parts within; Figs. 3 and 4 are cross-sections on the lines 3—3, and 4—4, respectively, of Fig. 1; and Fig. 5 is a central, longitudinal section of one end of the driving wheel, showing a modification.

The brake mechanism of this application resembles that described in my other application Serial No. 436,150, already filed, in that a stationary, longitudinally split brake shell within the hub is expanded out against it by a brake actuator that is moved longitudinally on back pedaling, first to engage and then to operate the brake. The brake mechanism here shown differs from that shown in the other said application in that here the brake actuator engages directly with the brake shell itself, thus dispensing with the additional part employed in the other construction to expand the brake.

The driving mechanism of this application resembles that shown in the pending application of Forsyth and Ellett, Serial No. 415,726. But there the clutch itself acts as a brake on back pedaling, while here it connects the driver operatively with a separate, nonrotary brake mechanism on back pedaling.

Referring to the drawings, 1 is the axle, adapted to be locked within the rear forks 2, 2 of the bicycle frame by the nuts 3, 3, respectively. On one end of the axle there is the usual sprocket 4 that is attached to the block 5, and supported by ball bearings 6 on the cone 7. At the other end of the axle there is a stationary block 8 that is held against rotation by suitable means, as by the washer 9 with a lug that extends through the bifurcated fork 2 and enters a recess in said block, as shown by dotted lines in Fig. 2.

The hub X is rotatively supported by ball bearings 10 at one end, and 11 at the other, upon the sprocket extension 5 and the stationary block 8, respectively. The brake shell 12 is supported by the carrier 13. Diametral recesses 14 and 15 in the brake shell and its carrier, respectively, receive the diametral shoulder 16 on the stationary block 8, so that both brake shell and carrier are held against rotation, and, at the same time, both are movable longitudinally toward and from the stationary block 8.

A wedge 17 on the carrier, and preferably an integral part of it, enters the longitudinal slot 18 in the brake shell, and engages its beveled edge 19. The other end of the brake shell is beveled at 20 to correspond with a wedge 21, formed on the end of the diametral shoulder 16. Accordingly, when the sleeve 13 is forced inwardly toward the left in the drawings, the longitudinally movable brake-actuating wedge 17 forces the brake shell in upon the stationary actuating-wedge 21, and, since the brake shell is held against rotation by both of said wedges, it will be expanded out against the hub.

The clutch for forward driving fulfils also the function of transmitting from the driver 4 to the brake-actuating wedge 17, on back pedaling, a longitudinal thrust to actuate the brake. This clutch consists of an expansible ring 22, split longitudinally, that is expanded by a lever 23 that enters between its separated ends. In the drawings the ring is represented as consisting of two shoes 22.

The shoes and lever are supported by the sleeve 24, and the abutment 25 is attached thereto.

In forward pedaling a shoulder 26 on the driving sprocket-extension 5 engages the lever 23 and forces the shoes 22 out radially, so that they clutch the sprocket to the hub X for driving the wheel.

On back pedaling a cam 27 on the sprocket extension engages a corresponding face on one of the members of the clutch and forces it in against a flange 28 on the clutch supporting sleeve, which in turn acts upon the brake-actuating wedge 17 and its sleeve 13, and so expands the brake.

In the construction shown in Fig. 2, the cam 27 engages one of the shoes 22, while in the construction shown in Fig. 5, the cam 27ª engages the lever 23ª which is beveled to meet it, the shoes 22ª being expanded by the lever as before.

If a retarder is employed, the sleeve 24 may be extended in beneath the brake supporting sleeve 13, as represented by 28 in Fig. 1, and a retarder 29 attached to the end of it that will engage the nonrotary sleeve 13.

What I claim is:

1. In a back pedaling coaster brake, the combination with a driver, of a driven hub; a brake anchor, projecting within the hub and having an inwardly directed wedge at its inner end; a nonrotary, longitudinally movable, brake-supporting sleeve, having a wedge opposite to and directed toward the said wedge on the anchor; an expansible, longitudinally movable, brake-ring, split longitudinally to receive said wedges, and beveled at its edges to engage them; and means, operated by the driver on back pedaling, adapted to force the brake supporting sleeve and brake ring longitudinally to expand the latter; substantially as shown and described.

2. In a back pedaling coaster brake, the combination with a driven hub, of a nonrotary expansible brake; a brake actuator adapted to operate said brake by longitudinal movement; a clutch, adapted both to expand to engage said hub, and to move longitudinally to engage said brake actuator; a rotary driver; and means upon the driver adapted, respectively, to engage said clutch on forward pedaling to operate it, and to force said clutch longitudinally against said actuator on back pedaling; substantially as shown and described.

3. In a back pedaling coaster brake, the combination with a driven hub, of a nonrotary expansible brake; a brake actuator adapted to operate said brake by longitudinal movement; an expansible clutch, comprising a ring split longitudinally and a lever between the separated ends of the ring; and a driver, having a shoulder projecting within the hub, adapted to engage the lever to operate it on forward pedaling, and also having a cam projecting within the hub and adapted on back pedaling to engage one of the members of the clutch to move it longitudinally into engagement with the brake actuator to operate the brake; substantially as shown and described.

FREDERICK S. ELLETT.

Witnesses:
DAVID L. WHITTIER.
RALPH D. WEBSTER.